United States Patent [19]

Egosi

[11] 4,313,305

[45] Feb. 2, 1982

[54] FEEDBACK ENERGY CONVERSION SYSTEM

[76] Inventor: Dan Egosi, 7 Ben Gurion Blvd., Tel Aviv, Israel

[21] Appl. No.: 76,664

[22] Filed: Sep. 18, 1979

[51] Int. Cl.³ .......................................... F01K 17/00
[52] U.S. Cl. ............................. 60/648; 203/DIG. 20
[58] Field of Search ................. 60/670, 676, 648, 678; 203/DIG. 20

[56] References Cited

U.S. PATENT DOCUMENTS

| | | | |
|---|---|---|---|
| 3,257,290 | 6/1966 | Starmer | 203/DIG. 20 |
| 3,352,107 | 11/1967 | Blaskowski | 60/648 |
| 3,926,743 | 12/1975 | Cywin | 60/648 |
| 3,962,873 | 6/1976 | Davis | 60/641 |
| 4,239,603 | 12/1980 | Egosi | 60/648 |

FOREIGN PATENT DOCUMENTS

157413  9/1932  Fed. Rep. of Germany ........ 60/670

*Primary Examiner*—A. Michael Chambers
*Attorney, Agent, or Firm*—Kenyon & Kenyon

[57] ABSTRACT

A heat pumping process for the generation of industrially useful heat energy achieves an improved fuel effectiveness by feeding back to the process part of its otherwise output heat energy as an input to assist in compressing the process evaporized performing fluid. An equivalent amount of extraneous fuel otherwise required to carry out the mechanical work now done by the fed back energy is thus replaced.

57 Claims, 3 Drawing Figures

FEEDBACK ENERGY CONVERSION SYSTEM

The present invention relates to advanced fuel effectiveness in energy conversion. In particular, it pertains to a novel method and system for the generation of heat energy by mechanical means, characterized by a considerably lower fuel input per unit of heat generated than in comparable systems.

Existing fuel-employing heat generating systems can be classified into two categories. The first comprises the direct firing systems (including boilers, furnaces, etc.) which combust fuel directly to generate heat. They have a single input of energy into the system, in the form of fuel, or more accurately, in the form of chemical energy contained in the fuel. Since some heat is inescapably lost during heat generation, the ratio of thermal output per heating value of consumed fuel is always lower than 1.0 (100%) in direct firing systems. These systems will be referred to hereinafter as first category systems and their process as the first category process.

The second category comprises the mechanical systems (including heat pumps, vapor compression systems, etc.) which generate useful thermal energy by way of extracting dispersed heat from a low temperature reservoir during evaporation of a working fluid and by subsequent compressing of the thus gained vapor to a higher output temperature level. These systems possess two different kinds of input of energy into the system: one kind in the form of fuel for a heat engine to drive the compressor and a second kind in the form of latent heat extracted by the vapor from the low-temperature reservoir. As stated, though some heat is inescapably lost during operation, the thermal output of these systems is usually higher than the heating value of the consumed fuel because the intake of latent heat by the vapor is generally large enough to compensate at least for this loss, even if this loss comprises also the reject heat from the heat engine. The ratio of heat output to fuel input in these mechanically operated heat generating systems is thus mostly above 100% and may reach a considerably higher value, especially if said reject heat from the heat engine is also retrieved at a useful temperature level. These systems will be referred to as the second category systems and their process as the second category process.

The present invention introduces a third and novel category of heat generating systems. They are mechanically operated in a manner similar to the systems of the second category, the difference being that they have a third energy input of still another kind. This input enables certain suitable and already relatively fuel efficient heat generating systems for formerly the second category to achieve a higher magnitude of fuel economy, and it is this additional fuel saving per heat unit generated which represents this invention's principal objective. Other concurrent objectives are the generation of cooling capacity and the conversion of impure water into pure, while additional objectives will become apparent during the ensuing general and detailed description of the invention. These systems will be referred to as third category systems and their process as the third category process, or process of the invention.

No similar or comparable mechanical heat generating process which operates on the basis of three different kinds of input energy exists in prior art systems. Even regarding the present invention as an improvement of existing second category systems, the present invention is still novel in conception and operation among known ways of enhancing the fuel effectiveness of basic second category processes (such as by intermediate heat extraction during compression). As such, the method of the present invention is applicable in many cases, over and above those ways known.

The third kind of energy input mentioned above as characteristic of the present invention consists of otherwise output heat energy of the process.

Broadly speaking, a certain suitable portion of the output heat energy is fed back into the process as an input, to take part in the driving of the compressor or other equipment, thus replacing an equivalent amount of fuel formerly required to produce the same mechanical work now done by the fed back energy. The total thermal energy input into the process remains the same before and after output energy feedback. The only difference in this respect is that before, i.e., in a process of the second category, all the driving energy is provided by fuel, while in the process of the third category, only part of the driving energy is furnished by fuel, while a complementary part is supplied by feedback of otherwise output heat energy.

Feedback may be implemented by any one or a suitable combination of the following means: (a) by surface heat transfer from a high temperature otherwise output heat stream to the working fluid of an external combustion engine in the temperature range otherwise obtained from the combustion of extraneous fuel; (b) by generating an otherwise heat output stream in its liquid state and providing it to the boiler of an external combustion engine as working fluid at boiler pressure at a temperature range otherwise supplied by heat deriving from the combustion of extraneous fuel; (c) by generating an otherwise heat output stream in its vapor state at elevated pressure and expanding it in an expander, such as a steam or vapor turbine, and employing the mechanical or electric power generated by said feedback expander to drive an appropriate part of the process equipment, such as a compressor stage, thereby making it possible to reduce the size of the main prime mover, thus saving extraneous fuel.

Suitable prime movers for feedback implementation according to a and b above are generally external combustion engines, such as boiler/expander systems, whose working fluid is able to receive feedback heat, while prime movers for c can include both external and internal combustion engines.

Output heat energy feedback has a negative effect on systems which possess a fuel effectiveness (i.e., the percentage of thermal output per heating value of fuel consumed) of not higher than 100%, thus making it impractical for systems of the first category. However, when the fuel effectiveness rises to above 100%, the effect of energy feedback grows progressively in an exponential manner, as will become apparent from the later ensuing mathematical demonstration.

The ratio of thermal output per heating value of the consumed fuel when above 100% is termed hereunder the factor of augmentation. This factor compares the actual performance of a system to the heating value of the fuel consumed, which heating value can only be achieved under ideal conditions of combustion. The factor of augmentation represents thus a measure of the effectiveness of fuel consumption in a heat generating process of the second or third category.

The potential of the concept of output heat energy feedback, as introduced by this invention, to save extraneous fuel per unit of heat output can be illustrated by an abstract mathematical example: When a process of the second category achieves a factor of augmentation of, for instance, 1.6, it means that for a heat energy input of, for instance, 1000 kcal (kilocalories) thermal equivalent of fuel, a thermal output of 1600 kcal is accomplished, which makes 1600/1000=1.6. When in this abstract case, for instance, 400 kcal of otherwise output heat energy are fed back into the process, firstly, the output is reduced by 400 kcal, making it 1200 kcal, secondly, the fuel input is reduced by 400 kcal, making it 600 kcal so that the augmentation factor is increased to 2.0 (1200/600).

It should be noted that the total energy input into the heat engine (or heat engines, when a feedback turbine is employed) remains unchanged (600 kcal from fuel plus 400 kcal from feedback make 1000 kcal) so that the engine can perform the same work as before implementation of feedback. The marketable thermal output of this third category system, as compared to the initial second category system, is now reduced by 25% (1600 kcal are reduced to 1200 kcal), but since the fuel input is reduced by 40% (from 1000 kcal) each of the new output heat units has consumed only 0.5 heat units deriving from extraneous fuel, instead of 0.625 heat units (1000 kcal/1600 kcal) as in the initial second category system.

The savings in fuel per input of 1000 kcal extraneous fuel, over a boiler system of the first category possessing a thermal efficiency of 0.85, amount to (1600−1000)/0.85=706 kcal for the second category system and to (2000−1000)/0.85=1170 kcal for the third category system.

If the initial factor of augmentation were 2.8, for instance, a feedback of 400 kcal would increase the factor of augmentation of 4.0, and if the feedback amounted to the same percentage of initial input as above, i.e. to 700 kcal, a factor of augmentation of 7.0 would result. A hypothetical feedback equal to the initial fuel input amounts to (1600−1000)/(1000−1000)=600/0=infinite, indicating that the process has become fully self-sustaining while generating 600 kcal output heat in the time span formerly required to combust in the initial second category system, the amount of 1000 kcal thermal equivalent of fuel in the system's burner or engine.

On the other hand, if the initial factor of augmentation equals 1.0, any amount of feedback would cause no change, and feedback in a system possessing an out/in ratio less than 1.0 would only reduce said ratio. In a direct firing system of an efficiency of 0.80, for instance, a feedback of 400 kcal would thus reduce the ratio to (800−400)/(1000−400)=0.66.

Thus, contrary to the rule of diminishing returns, which governs so many transactions of thermodynamic improvement, a rule of accelerated returns is established for the optimization of actual working cases of the present invention, which rule postulates that the higher the initial factor of augmentation and the larger the feedback amount (as a percentage of total energy input), the higher will be the exponentially accelerated growth of the final factor of augmentation.

Of course, there is a limit to the amount of output heat energy that can be employed for feedback in any given case. This limit is set by the availability of otherwise output heat energy having a temperature suitable for heat transfer and/or for heat supply and/or for generation of mechanical power, according to the three methods of implementation described above.

As is known, the factor of augmentation in heat generating systems of the second category decreases with increasing temperature difference between the low temperature heat source and the high temperature output stream. Though this characteristic of the second category systems works against the requirements of the third category systems, it does not exclude the application of the process of the invention to suitable working cases in the intermediate range where the temperature difference between the low temperature heat source and high temperature output stream is not so large as to cause a low initial factor of augmentation but is large enough to provide sufficient heat energy of a characteristic suitable for feedback.

Though the term "working" fluid is in general use for the fluid of vapor compressing cycles, such as heat pump systems, it designates the opposite of what it should, because the fluid does not do work but is worked upon. On the other hand, the term "working" fluid is correct for the fluid of external combustion engines. For clearer understanding of the following discussion, the fluid of the vapor compression cycle will be termed the "worked upon" or the "performing" fluid, as opposed to the "working" fluid of the heat engine cycle. The term "operating" fluid will be used generically to cover both kinds.

Suitable performing fluids for the vapor compression cycle include water and commercially available heat pump fluids having sufficient heat resistance in the chosen temperature range and a critical temperature point well above the cycle's condensation temperature. Suitable working fluids for the heat engine cycle include water and commercially available vapor turbine (vapor expander) fluids with specifications similar and/or complementary to the ones above so that they can be used in cooperating closed cycles. In open circuit operation, water will usually be the working and/or the worked upon fluid for economic reasons. The use of other fluids normally will be restricted to systems in which the fluid is continuously recirculated.

The heat of the low temperature heat source may be initially contained in water, in air, or in other fluids. Examples of aqueous sources include: condensing water from steam plants, including nuclear power stations; industrial effluents; solar and geothermal heat streams; engine, compressor, and industrial process cooling water, and—as a last expedient—ambient water bodies. Air sources include: air rejected from air conditioning systems, from industrial processes or from engine and compressor cooling; solar heated air; and—as a last expedient—ambient air. Other fluid sources include: furnace flue and stack gases; heat transfer fluids; cooling oils and lubricating oils to be cooled, and many industrial products to be cooled.

BRIEF DESCRIPTION OF THE DRAWINGS

FIG. 1 is a schematic flow diagram of an embodiment of the present invention which comprises two separate and closed, but mutually interacting, operating cycles. In this arrangement, output heat energy feedback is implemented in two ways, the one by surface heat transfer of output heat from the performing fluid of a vapor compressing cycle into the working fluid of an external combustion engine serving as a prime mover for the compressor; the other by converting part of the output heat energy into mechanical and then electric power for a motor which is then used to drive part of the equipment.

DETAILED DESCRIPTION OF THE DRAWINGS

Figure 1:
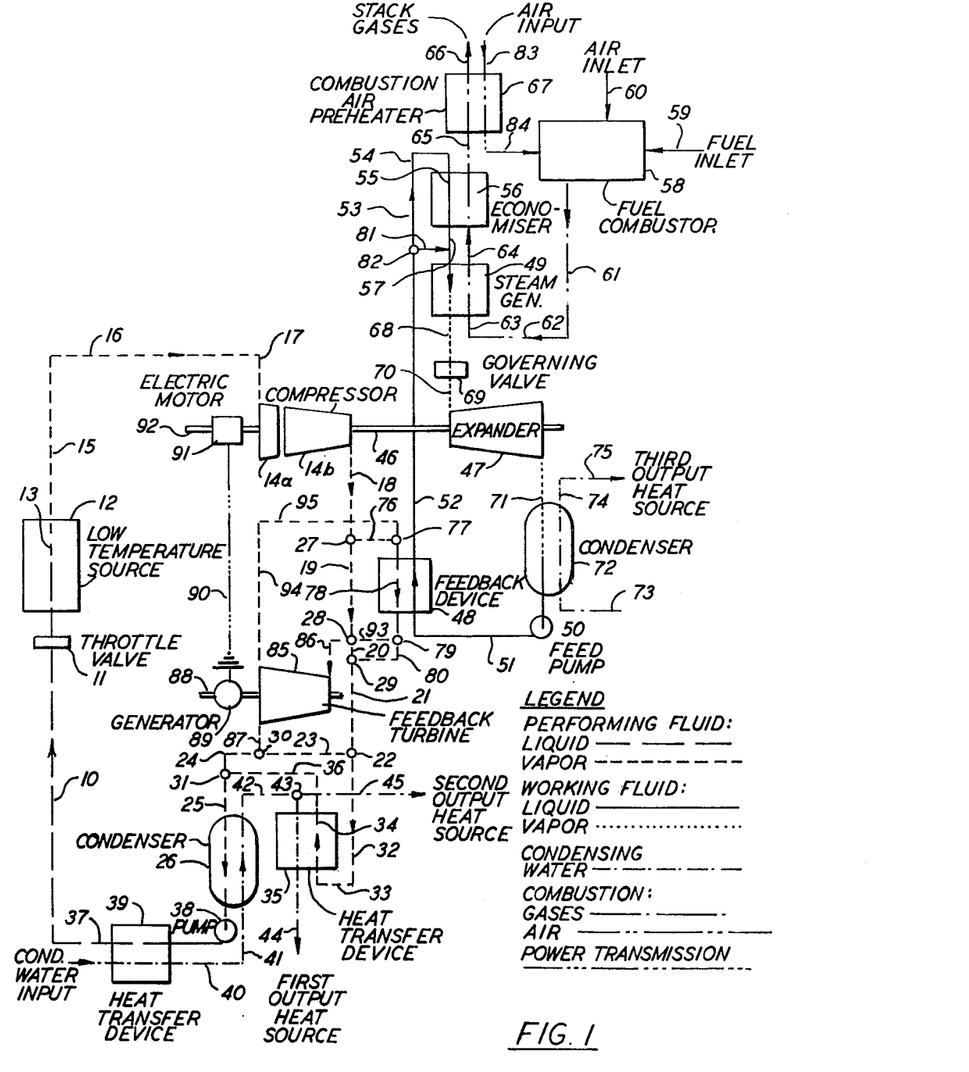

FIG. 1 illustrates a system according to the present invention for saving extraneous fuel in mechanical heat generation wherein the schematic presentation comprises: a closed vapor compressing cycle in long-dash lines where the performing fluid is in the liquid state and in short-dash lines where the performing fluid is in the gaseous state; a closed working cycle of an external combustion engine in solid lines where the working fluid is in the liquid state and in dotted lines where the working fluid is in the vapor state; condensing water routes in short-dash-dot lines; hot flue gas routes in long-dash-dot lines; combustion air routes in long-dash-two-dot lines; and electric power transmission routes in short-dash-three-dot lines. Circled points placed on crossing conduits indicate T or X connections of these conduits, while uncircled crossings of conduits indicate no connection but bridging over or under.

With reference to FIG. 1, the performing fluid of the vapor compression cycle is chosen to be of general suitability for the process and also to be compatible with the working fluid of the external combustion engine and vice-versa. Said performing fluid, in the liquid state and at or near ambient temperature, proceeds in conduit 10 in the direction indicated by the arrow through valve 11 which governs the fluid's mass flow into low temperature source 12. Upon entering source 12 the fluid continues in conduit 13, which possesses heat transferring walls, so that heat may flow from the source to the fluid. Conduit 13 may take the form of a coil or finned tube, generally the same as in conventional low grade heat absorbing units of heat pump systems.

The pressure within heat transfer conduit 13 is maintained, by the joint action of throttle valve 11 and a compressor 14, below the saturation pressure corresponding to the liquid fluid's temperature, so that the fluid will flash off vapor as it absorbs its required heat of evaporation from low temperature heat source 12 through the walls of conduit 13.

The generated vapor is drawn via conduits 15, 16, and 17 into compressor 14. Though compressor 14 is depicted as consisting of two parts or stages without a connecting shaft between them, for the time being this fact may be disregarded, and the compressor may be looked upon as an undivided unit able to compress the generated vapor at a compression ratio which will provide superheated vapor at the temperature level specified for the high temperature reservoir for, at most, part of the output heat energy from the system.

Since the embodiment of FIG. 1 includes energy feedback (a) by surface heat transfer, as well as (b) by conversion into mechanical and electric power, said temperature level specified for the high temperature reservoir has to satisfy the following stipulations: For (a) said superheat has to be high enough, when being transferred to the working fluid of the external combustion engine, to form a predetermined portion of said working fluids' enthalpy, which portion would otherwise have to be supplied with heat deriving from the combustion of extraneous fuel. For (b) the temperature difference between the low temperature source and the high temperature reservoir has to be sufficiently large to be able to provide a predetermined work-doing enthalpy drop during expansion, eventually to a back pressure whose corresponding condensation temperature is still high enough for at least space heating requirements.

As already mentioned, FIG. 1 serves to illustrate heat energy feedback via surface heat transfer into the working fluid of an external combustion engine as well as via converting the energy into mechanical and electric power. Both ways are shown not only in single application but also one after the other and side by side. The routing for the basic second category process is shown as well, in order to facilitate comparison.

In a process of the second category, the compressed superheated vapor at the temperature level of the high temperature reservoir is routed via conduits 18, 19, 20, and 21 up to point 22, and from there via conduits 23, 24, and 25 into condenser 26; while the connecting side lines at points 27, 28, 29, 30, and 31 are nonoperative.

In condenser 26, the heat of condensation of the vapor is transferred to a condensing fluid passing in counterflow. Since the vapor is superheated, the hot condensing fluid may be led back, after leaving the condenser, to absorb the vapor's superheat prior to condensation. In this event, the compressed vapor compressor 14 in conduits 18, 19, 20, and 21 to point 22 does not enter conduit 23, which remains nonoperative, but continues in conduits 32, 33, and 34 into heat transfer device 35 to give off its super-heat to the condensing fluid in counter-flow, prior to continuing in conduit 36 to reach connecting point 31 which is situated on the former route of the compressed vapor on its way to condensor 26.

The condensed performing fluid is pumped back via conduit 37 by pump 38 to conduit 10 to close the cycle. However, since the performing fluid is still at the relatively high condensation temperature, its remaining heat above ambient is preferably transferred in heat transfer device 39 in counter-flow to the same condensing fluid which will later take up the heat of condensation and eventually also the superheat of the compressed vapor. The route of the condensing fluid thus comprises conduit 40, where it enters in the direction of the arrow, conduit 41, where it condenses the vapor, conduit 42 up to point 43, and out via conduit 44. Because the mass flow rate of condensing fluid in heat exchange device 35 may be disproportionately large in comparison to the superheat flow, an appropriate part of the condensing fluid may be discharged via conduit 45 at the condensation temperature, to enable the condensing fluid passing in conduit 44 to reach a higher temperature in the superheat range if so desired. Outlets 44 and 45 represent a first heat output source and a second heat output source of the process, respectively.

Compressor 14 of the second category process is operationally connected via shaft 46 to a vapor expander 47, such as a turbine, which forms part of a closed boiler/turbine working cycle, i.e., an external combustion engine cycle. Disregarding for the time being feedback device 48, the liquid working fluid of the cycle, appropriately pressurized to the operating pressure of a steam generator 49 by a feed pump 50, proceeds via conduits 51, 52, 53, 54, and 55 into an economizer 56, where the liquid working fluid absorbs the heat still remaining in the flue gases, passing in counterflow, after their leaving steam generator 49 prior to entry of the working fluid via conduit 57 into steam generator 49.

The flue gases are generated in a fuel combustor 58, which receives fuel at fuel inlet 59 and air at air inlet 60. The hot flue gases proceed via conduits 61, 62, and 63 at first into steam generator 49, where they are cooled to a temperature corresponding to the operating pressure of the steam generator. From there the flue gases pass on via conduit 64 into economizer 56, where they are cooled to the temperature of the condensate entering via conduit 55, and then out via conduit 65 and smokestack 66, disregarding for the time being combustion air preheater 67.

The vapor generated in steam generator 49 is at its top enthalpy at this point of the cycle. It proceeds via conduit 68 through governing valve 69, which controls the pressure and the mass flow rate of the vapor, and continues through conduit 70 into expander 47 where the vapor is expanded, preferably to a back-pressure whose corresponding condensation temperature is at least high enough for space heating purposes. The expanded vapor leaves turbine 47 by conduit 71 to be condensed in condenser 72, from where the condensate is returned by feed pump 50 into conduit 51 to close the working fluid cycle. Condensing fluid enters by conduit 73, passes in counter-flow to the vapor via conduit 74 and out via conduit 75, which represents a third output heat source of the process.

It is obvious that in this second category process all the work output of turbine 47 derives from the input of extraneous fuel into fuel combustor 58 and that all compression work is carried out by the mechanical power supplied by turbine 47.

To implement heat energy feedback by surface heat transfer from the vapor compression cycle to the working cycle of the external combustion engine, the route of the compressed performing fluid vapor leaving compressor 14 in the second category process undergoes the following deviation: at point 27 the vapor does not continue via conduit 19, which remains nonoperative in this case, but is routed via conduit 76 to point 77 from where it continues via conduit 78 into feedback device 48, a heat exchanger which transfers, preferably in counter-flow, all or part of the superheat contained in the performing fluid vapor to the working fluid of the engine, care being taken not to cool to below the vapor condensation temperature. When leaving heat transfer device 48, the vapor, at or above its condensation temperature, continues up to point 79 and then proceeds via conduit 80 to point 29, where it returns to the route of the vapor in the second category process and continues through conduit 21.

As in the second category process, when the vapor does not contain any more superheat, it proceeds from point 22 directly via conduits 23, 24, and 25 into condenser 26; when it does contain superheat, it proceeds from point 22 at first via conduits 32, 33 and 34 into superheat transfer device 35 and from there by conduits 36 and 25 into condenser 26.

The temperature of the working fluid serving as boiler feed, up to feedback device 48, is the same as in condenser 72, while in feedback device 48 a second stage of boiler feed preheating is implemented. Though the specific heat of the vapor on the performing fluid side of feedback device 48 is generally far lower than the specific heat of the liquid on the working fluid side, the boiler feed temperature may eventually be raised in feedback device 48, depending on the relative mass flow of the specific case, up to the temperature of the freshly compressed vapor of the performing fluid at the point of its exit from compressor 14. Since, in many cases, the superheat temperature level of the performing fluid may well exceed the critical temperature point of the working fluid, heat transfer device 48 in that event becomes the actual steam generator while the fuel fed steam generator becomes a superheater. In any case, the quantity of extraneous fuel otherwise required as input for fuel combustor 58 to heat the boiler feed to the temperature reached in feedback device 48 is then saved, but only if the necessary care is taken not to lose the advantage through the smokestack, as will become apparent from the following.

As was mentioned above in the description of the second category process, the working fluid enters economizer 56 at first to absorb the heat still remaining in the flue gases leaving steam generator 49. When boiler feed preheating is carried out in feedback device 48 in this third category process, the economizer becomes redundant, and the boiler feed may take the shorter route of conduit 81, starting at point 82, into steam generator 49. Secondly, so as not to lose the heat remaining in the flue gases after their leaving steam generator 49, combustion air preheater 67 is introduced in place of the economizer, or the economizer may become a combustion air preheater in which the remaining heat is transferred to the combustion air coming in via conduit 83 and reaching fuel combustor 58 via conduit 84 at or near the operating temperature of steam generator 49, while former air inlet 60 becomes redundant.

To implement heat energy feedback by way of converting heat energy into mechanical and/or electric power and then using said power to drive an appropriate part of the equipment, such as a compressor stage, the compressed and superheated performing fluid vapor leaving compressor 14 proceeds via conduits 18 and 19 up to point 28 from where it enters feedback turbine 85 by conduit 86, while all other side connections are nonoperative. In turbine 85 the vapor is expanded to a predetermined back pressure at which the superheat content, if any, of the partly expanded vapor is still high enough (after condensation of the vapor and after transfer of the remaining superheat, if any, to the condensing fluid as temperature addition) to answer the requirement for medium high output temperatures for part of the condensing fluid's mass flow, if so desired.

The partly exhausted vapor leaves feedback expander 85 via conduit 87 to point 30. When the vapor does not contain any more superheat, it proceeds via conduits 24 and 25 into condenser 26; when it still contains superheat, it proceeds via conduits 23, 32, 33, and 34 into superheat transfer device 35 where the superheat is transferred to at least part of the condensing fluid. Leaving heat transfer device 35, the vapor reaches point 31 via conduits 34 and 36, from where it enters condenser 26.

Expander 85, which may be either a reciprocating engine or a turbine, is connected by shaft 88 to generator 89 whose electric power is supplied by power transmission line 90 to electro-motor 91. Electro-motor 91, in turn, is operatively connected to compressor stage 14a by shaft 92, which is not part of shaft 46, as shown by the absence of any shaft between compressor stages 14a and 14b. The size of compressor stage 14a in relation to the whole compressor 14a and 14b is adapted to the power delivered to electro-motor 91, which is its sole primemover, meaning that turbine 47 has to drive only turbine stage or stages 14b, thus saving an appropriate part of the otherwise required input of extraneous fuel into fuel combustor 58.

Alternatively, shaft 88 may be connected to shaft 92 solely by mechanical means, so that items 89, 90 and 91 represent a mechanical power transmission, wherein items 89 and 91 are driving wheels and item 90 a driving belt or chain. In another alternative, shown in FIG. 3, compressor stage 14a sits directly on shaft 88, thus making the electrical and mechanical drive unnecessary.

To implement heat energy feedback by means of the two ways described heretofore, but one after the other, the compressed vapor leaves compressor 14 by conduit 18 up to point 27, from where it takes conduits 76 and 78 at first to heat transfer device 48 and then proceeds to point 79 to take conduits 93 and 86 to expander 85, while all other side lines are nonoperative. The partly exhausted vapor which leaves by conduit 87 has a choice at point 30, depending on its superheat content, to proceed either by conduit 24 or by conduit 23 according to the criteria set forth above in the last way of feedback. This combination may be employed in working cases wherein the working fluid of the engine is regeneratively preheated, such as in steam power stations. In these cases heat transfer device 48 is only able to transfer heat in the range above the regenerative preheat temperature level, so that the heat energy below said level remaining in the performing fluid may be used for expansion in expander 85.

Alternatively, the compressed vapor leaving compressor 14 is led at first into expander 85 and then into heat transfer device 48. In that case, the compressed vapor proceeds via conduits 18 and 19 to point 28 and from there via conduit 86 into expander 85, while all other side lines are nonoperative. The partly exhausted vapor leaves via conduits 94 and 95 up to point 77, from where it passes heat transfer device 48 in conduit 78 up to point 79, then via conduits 80 and 21 to point 22. At point 22 the choice exists for the vapor to at first give off its remaining superheat, if any, prior to condensation or not, as in the first way of energy feedback described above.

To implement heat energy feedback by means of the two ways described heretofore, but both side by side, the compressed vapor leaves compressor 14 by conduit 18 up to point 27, where the vapor flow is divided into two flows so as to accurately accommodate the requirements of the external combustion engine, on the one hand, and the feedback turbine 85, on the other hand, of any given set of equipment. One flow proceeds via conduits 76 and 78 into heat transfer device 48 to give off heat into the working fluid of the external combustion engine and then continues via conduits 80 and 21 to point 22. At this point the choice exists for the first flow to give off in heat transfer device 35 its remaining superheat, if any, prior to condensation or not, as in the first way of energy feedback described above. The second flow proceeds from point 27 via conduit 19 to point 28 and from there via conduit 86 to feedback turbine 85 for expansion. The expanded vapor leaves via conduit 87 up to point 30, where the choice exists to take either conduit 23 or conduit 24, depending on the vapor's remaining superheat, as above.

Since, in the last three routings of the vapor, the temperature of the working fluid entering steam generator 49 was raised by the transfer of heat in feedback device 48, care must be taken—as in the first routing—to preheat the incoming combustion air to the same raised temperature level as is attained by the working fluid, so as not to incur a loss to the system.

Figure 2:
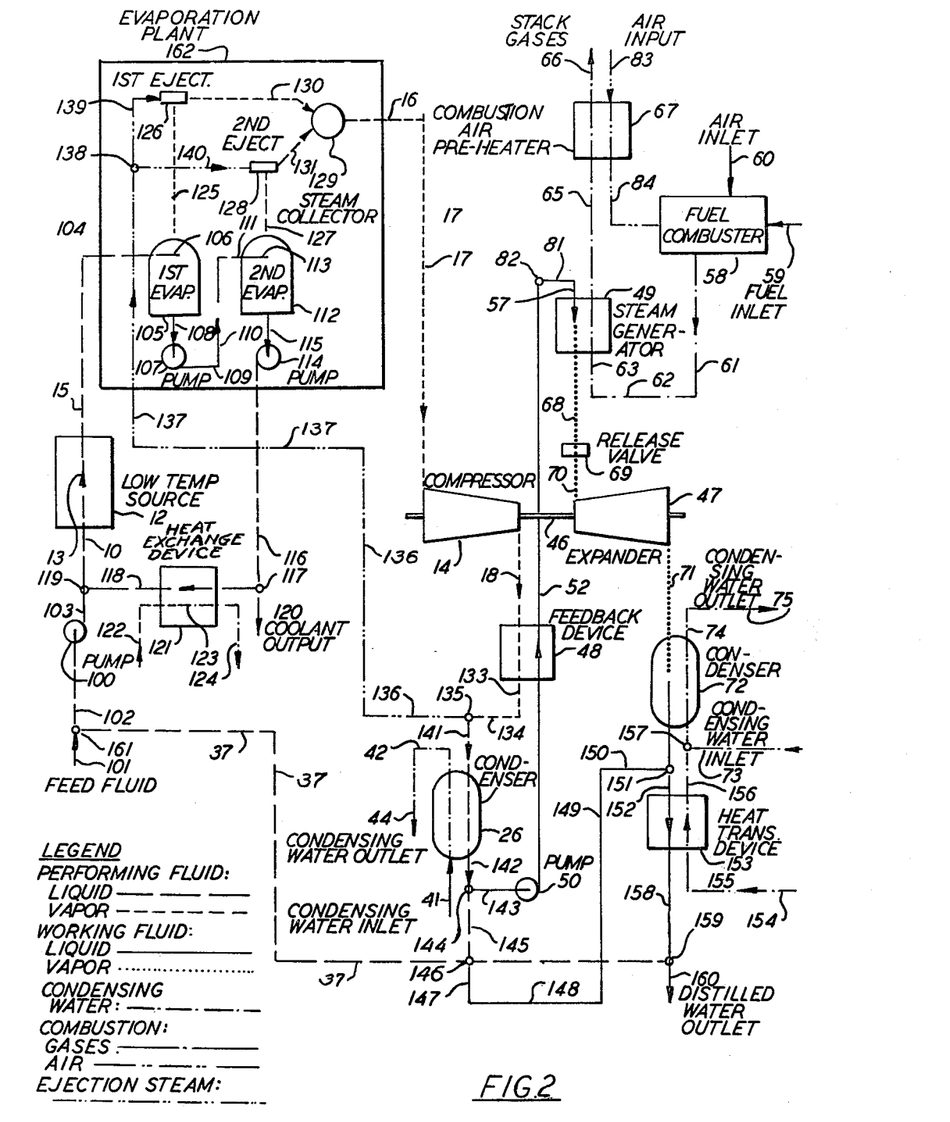
FIG. 2 is a schematic flow diagram of another embodiment of the present invention which comprises a once-through operation of an operating fluid in an open-circuit lay-out. In this arrangement output heat energy feedback is implemented by providing an already preheated boiler feed fluid, in its liquid state, for delivery to the boiler of an external heat engine.

FIG. 2 illustrates an alternative embodiment of the present invention in which otherwise output heat energy feedback is implemented by continually supplying an already preheated working fluid to an external combustion engine in an essentially open-circuit once-through operation. Though the two separate closed operating cycles of the embodiment in FIG. 1 are thus eliminated and transformed into one combined route, the schematic representation nonetheless continues to show the equivalent of the former performing cycle of the vapor compressing step and the equivalent of the former working cycle of the engine by drawing lines of the same character as in FIG. 1, for both the liquid and the vapor states. The short-dash-two-dot line is an addition to the legend and represents ejecting steam conduits. For convenient reference, elements which are the same as elements in the embodiment of FIG. 1 are identified by the same numbers, and since the numbers pertaining solely to FIG. 2 start with 100, all two-digit numbers refer to identical elements in FIG. 1.

Since there is only one combined route, there is also only one operating fluid, which then has to possess the combined properties required from a working and a worked-upon fluid separately, as set forth above. Though any suitable working fluid may be employed for the embodiment of FIG. 2, including fluids of an atmospheric boiling point near to the temperature of the low grade heat source, FIG. 2 serves mainly to describe the operation of the process by means of an operating fluid with a higher atmospheric boiling point, such as water.

Feed fluid in its liquid state, such as water, at or near ambient temperature is introduced into the system by pump 100 through conduits 101, 102, 103, and 10 into low-grade heat source 12. Upon entering source 12 the feed fluid continues in conduit 13, which possesses heat transferring walls, so that heat may flow from the source to the fluid. As in the embodiment of FIG. 1, conduit 13 may take the form of a coil or a flanged tube, or a plurality of them. Alternatively, the wall of conduit 13 may represent the condensing surface of a condenser, such as from a steam plant, with the feed fluid on the condensing water side so that the heat of condensation will be absorbed by the fluid.

Contrary to FIG. 1, the fluid will not flash off vapor because the pressure within conduit 13 is not lowered but is kept above the saturation pressure of the fluid at the temperature induced by the low temperature source. The by now warmer fluid continues via conduits 15 and 104, from where it is sprayed as a fine mist by means of atomizing nozzles 106 into evaporation chamber 105. Chamber 105 is kept at a pressure below the pressure corresponding to the saturation temperature of the liquid fluid at its temperature upon entering, so that an appropriate part of the fluid flashes off, i.e., evaporates, while absorbing the sensible heat of the surrounding spray as latent heat of evaporation.

The remainder of the liquid fluid collects at the bottom of chamber 105 from where it is withdrawn by pump 107 via conduit 108 and pumped via conduits 109, 110 and 111, from where it is sprayed as a fine mist by means of second set of atomizing nozzles 113 into second evaporation chamber 112. Because chamber 112 is kept at a pressure lower than the pressure maintained in chamber 105, an additional portion of the liquid fluid flashes off, while the remainder accumulates at the bottom of the chamber to be withdrawn by pump 114 via conduits 115 and 116 up to point 117.

Though two evaporation chambers are shown in FIG. 2, the process may be implemented also with one chamber or with more than two. In the latter case, a falling pressure gradient is established from chamber to chamber to enable additional evaporation in each chamber.

The extraction of the sensible heat from the liquid fluid to serve as latent heat of evaporation of the flashed off vapor causes the liquid fluid to cool accordingly. Theoretically, the cooling can be carried out to any level down to the freezing point of the feed fluid, if so desired. However, the generation of cooling capacity requires an additional input of work and will thus reduce the factor of augmentation of heat energy. Therefore, that downward cooling span, from the temperature at the entrance to the first chamber to the temperature at the exit from the last chamber which results in the highest factor of heat augmentation, is the smallest possible span. However, this would result in an unreasonably high mass throughput of feed fluid; so that practically the most proficient cooling span, with reference to heat generation solely, is small but already large enough to require an already reasonable throughput of feed fluid. Other criteria for the downward cooling span of the feed fluid are specific process requirements, such as a fixed condensing fluid temperature if, as assumed further above, the walls of conduit 13 represent a condensing surface of a steam plant's condenser.

Despite the above, the factor of augmentation will not suffer by the generation of cooling capacity if the unorthodox step is taken to include into the factor also the generated useful cooling capacity, i.e., to include not only calories but also frigories generated below ambient.

At point 117 there exist the following three choices. If the feed fluid is at or near ambient temperature, it may be channeled back through conduit 118 to point 119 to close the feed fluid cycle. If the feed fluid is cooled down to a temperature low enough for air conditioning requirements at least, the fluid may be delivered as coolant through coolant outlet 120, or the feed fluid may be routed via conduit 118 to point 119 while transferring its cooling capacity in heat exchange device 121 to an outside heat transfer fluid, such as water, passing in counter-flow via conduits 122, 123, and 124.

In the event of the second choice, pump 100 has to introduce new feed fluid into the open circuit at the rate, by weight, of fluid discharged at outlet 120 plus fluid evaporated in the evaporation chambers, while in the event of the first or the third choice only the evaporated quantity has to be replenished to the open circuit system.

The vapor evaporated from the feed medium in evaporation chamber 105 is evacuated through vapor outlet 125 at the top of the chamber by vapor ejector 126, while in chamber 112 the vapor is evacuated through vapor outlet 127 by means of vapor ejector 128. The functions of vapor ejectors 126 and 128 are threefold: firstly, to create and maintain the predetermined underpressure in the respective evaporation chambers; secondly, to evacuate continuously the generated vapor; and, thirdly, to thermocompress the evacuated vapor to a predetermined pressure common to both vapor ejectors. At this pressure, which is generally in the range of 0.05-0.15 bar, the thermo-compressed vapor is fed into steam collector 129 via conduits 130 and 131 respectively, to be introduced via conduits 16 and 17 into mechanical compressor 14.

Steam ejection is favored with operating fluids such as water, whose vapor possesses a very large specific volume at the pressure level prevailing in the evaporation chambers. With fluids of lesser volume, mechanical ejectors, such as impellers or fans, may be preferred. Thus, alternatively, elements 126 and 128 may represent mechanical ejectors driven by electric power provided either from within the process, such as indicated in the embodiment of FIG. 1, or from an outside network. Mechanical ejectors make ejecting steam conduits 136, 137, 139 and 140 and distribution valve 138 redundant.

The total mass flow rate of vapor compressed in compressor 14 amounts to the sum of the individual mass flow rate of vapor ejected from the chambers, on the one hand, plus the ejecting vapor consumed to achieve said vapor ejection on the other hand.

With the exception of the evaporation chambers operating at or near ambient temperature, all other components of this system are desirably insulated to prevent loss of heat to the vicinity so that the compression in compressor 14 is essentially adiabatic. The vapor is compressed in compressor 14 to such a superheat which is high enough—when later being transferred to the vapor's own condensate, which subsequently serves as the working fluid of the engine—to form a predetermined portion of said condensate working-fluid's enthalpy, which portion would otherwise have to be supplied with heat deriving from the combustion of extraneous fuel.

The highly superheated vapor leaves compressor 14 by conduit 18 to enter heat transfer device 48 wherein the vapor's superheat is transferred to the working fluid of an external combustion engine consisting of fuel combustor 58, steam generator 49, release valve 69, expander 47, and combustion air preheater 67.

The desuperheated vapor proceeds via conduits 133 and 134 to distribution valve 135, where the combined mass flow is divided again into its original individual flow rates. The ejecting steam proceeds via conduits 136 and 137 to distribution point 138, from where appropriate portions of it are supplied via conduits 139 and 140 to vapor ejectors 126 and 128, thus closing the ejecting vapor cycle for continuous ejection without requiring a vapor generating boiler, as is necessary in conventional practice.

The mass flow rate of vapor remaining at distribution valve 135 after the splitting off of the ejecting vapor comprises the vapor ejected from the evaporation chambers. This quantity is forwarded via conduit 141 into condenser 26, where it is condensed by an outside condensing fluid such as water, coming in counter-flow via conduit 41 and leaving via conduits 42 and 44. From condenser 26, the condensate is pumped by feed pump 50 via conduit 142 to flow-governing valve 144, which serves to regulate the relative mass-flow ratio of performing fluid of the vapor compressing part of the combined circuit (including ejecting fluid), on the one hand, to working fluid of the heat engine part of the combined circuit, on the other hand, by way of either introducing a complementary quantity of fluid if so required or discharging superfluous condensate if necessary via conduit 145. Discharge or introduction of fluid, if any, may take place at connecting point 146 into or out of liquid fluid return conduit 37, if the transferred quantity of fluid is insignificant. Alternatively, in the case of an open circuit route for the operating fluid, where there is no return line and/or if the transferred quantity is significant, so as not to lose heat in either direction, discharge or introduction of fluid takes place via conduits 145, 147, 148, 149, and 150 at connecting point 151, where the transferred fluid's temperature is closer to the temperature at point 144.

The main stream of condensate at its correct mass flow rate beyond flow-governing valve 144 is forwarded via conduit 143 by boiler feed pump 50 as boiler feed at boiler pressure to feedback device 48, from where the process of FIG. 2 continues up to point 151 in the same route and manner as in the version of FIG. 1 wherein energy feedback by way of heat transfer device 48 is implemented.

At point 151 the condensate coming from condenser 72 is at this condenser's condensing temperature. It proceeds from point 151 via conduit 152 into heat transfer device 153, where it gives off its heat above ambient to an ambient outside heat transfer fluid, such as water, which then preferably may serve also as condensing water for condenser 72. In that case, the outside heat transfer fluid enters heat transfer device 153 via conduits 154 and 155 and leaves via conduit 156 to connect at point 157 to conduit 74, which makes conduit 73 redundant.

From heat transfer device 153 the condensate continues in conduit 158 to valve 159. If the operating fluid is water, at this point it may be discharged via outlet 160 as pure distilled water, thus making the open circuit system of FIG. 2 also a water purification system, in addition to its capability of heat and cold generation. In this case, pump 100 has to introduce into the system presumably impure water at the same flow rate as pure water is discharged.

Though the purification of water was singled out here, this was done only to underline this invention's capability to answer the frequent demand for pure water for industrial and residential uses at minimal costs. Although demanded less frequently, other operating fluids, of course, may be purified in the same way.

When purification is not required, the condensate may be returned from valve 159 via conduit 37 to connecting point 161 as feed fluid. In that case, only as much new feed fluid has to be replenished via inlet 101 as is lost by the system by reason of leakage and loss.

Figure 3:
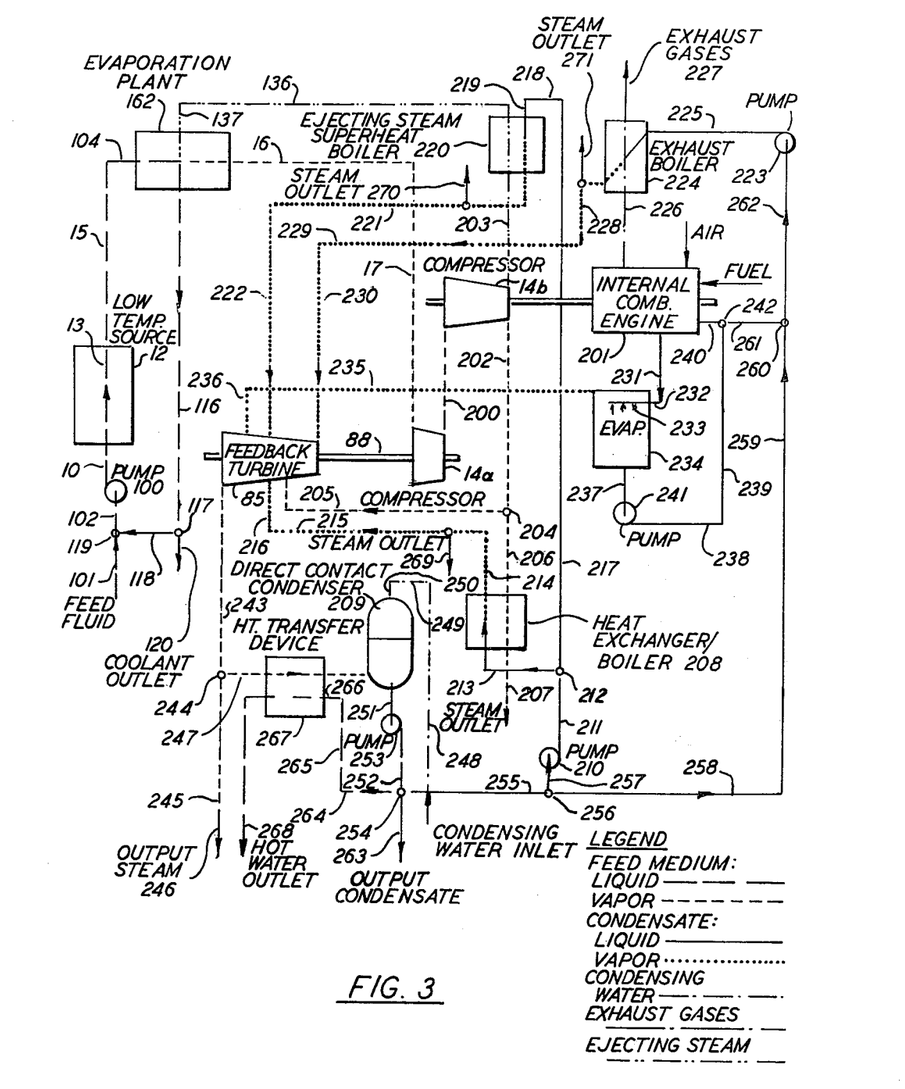
FIG. 3 is a schematic flow diagram of still another embodiment of the present invention in which a vapor compressing cycle is activated by an internal combustion engine. In this arrangement, feedback heat from four different output heat sources drives a steam turbine which takes over part of the compression load, thus enabling reduction of the engine's size and, hence, its fuel consumption.

Frame 162 encompasses the system's evaporation plant to indicate the extent up to which the evaporation plant mentioned in FIG. 3 is identical to the one of FIG. 2.

FIG. 3 depicts an additional embodiment of a system according to the present invention which is activated by an internal combustion engine, in contrast to the two former embodiments which are driven by external combustion engines.

The schematic representation of the system comprises: a vapor compressing cycle in long-dash lines where the feed-water is in its liquid state and in short-dash lines where the feed-water is in its vapor state; condensate cycles, including engine cooling cycles wherein the condensate of the vapor compressing cycle is depicted as full lines where it is in the liquid state and as dotted lines where it is in the vapor state; condensing water routes in short-dash-dot-lines; engine exhaust gas routes as long-dash-dot lines; and ejecting steam conduits in short-dash-two dot lines. Circled points indicate connections of conduits as in FIG. 1. For convenient reference, elements which are the same as elements in FIG. 1 or FIG. 2 are identified by the same numbers, and since the numbers pertaining solely to FIG. 3 start at 200, all two digit numbers refer to identical elements in FIG. 1 while all three digit numbers starting with the numeral 1 refer to identical elements appearing initally in FIG. 2.

Though in the majority of actual working cases the preferred operating fluid for the embodiment of FIG. 3 is water, it may as well be operated with many other fluids of suitable characteristics so that wherever water, aqueous fluid, steam, or a similar expression is mentioned below, the correct meaning of said expression should be interpreted as also to include other operating fluids in the same physical state.

Feedwater, at or near ambient temperature, is introduced into the system by pump 100 via conduits 101 and 102 and forwarded via conduit 10 into low grade heat source 12, as in the embodiment of FIG. 2. The warmed feed water proceeds via conduits 15 and 104 into frame 162 which represents in comprehensive schematic form an evaporation plant identical to the one shown in FIG. 2 by the same number, so that its elements and function have not to be repeated. Frame 162 possesses identical connections to the rest of the plant, which are warmed feed fluid inlet 104; cooled feed fluid outlet 116, ejecting steam inlet 137 and thermocompressed vapor outlet 16.

As in FIG. 2, if the cooled feed liquid leaving the evaporation plant by route 116 is at or near ambient temperature, it may be channelled back through route 118 to point 119 to close the feed fluid cycle. If the feed fluid is cooled down to a temperature low enough for, at least, air conditioning requirements, the fluid may be delivered as coolant by way of coolant outlet 120.

The flow rate of the vapor leaving the evaporation plant 162 in conduit 16 consists of the sum of the individual flow rates of the ejecting steam and of vapor ejected from the chambers. It proceeds in conduit 17 into compressor stage or stages 14a, where the vapor is partly compressed prior to being transferred in conduit 200 to compressor stage or stages 14b to complete its compression to its predetermined final pressure and corresponding superheat level.

Compressor stage 14a is operationally connected by shaft 88 to feedback turbine 85, which receives all its energy input from feedback, while compressor stage 14b is driven by way of shaft 46 by internal combustion engine 201, which receives all its energy input from extraneous fuel. Since compressor stages 14a and 14b together comprise all the compression means required for the embodiment of FIG. 3, and since not all the compression means of the system are driven by engine 201, but only compressor 14b, it follows that the work output of engine 201 may be reduced by the work output of feedback turbine 85, which work output amounts to the accumulative enthalpy drop occurring during the expansion of the steam supplied to it in the course of energy feedback. The reduced engine requires an appropriate smaller input of extraneous fuel, but, at the same time, the total work output of the two engines, namely engine 201 and turbine 85, remains the same as into engine 201 before its reduction in size as a consequence of energy feedback.

Sources of heat energy for feedback into turbine 85 are identical to heat output sources of the parallel second category process, and they include:

(a) the compressed superheated steam leaving compressor stage 14b by conduit 202, comprising the ejected steam quantity or part thereof;

(b) Alternatively to (a), the superheat solely contained in the compressed steam leaving compressor stage 14b by conduit 202, comprising the superheat of the ejected steam quantity or part thereof;

(c) the superheat solely contained in the compressed steam leaving compressor stage 14b by conduit 203, comprising the superheat of the ejecting steam quantity or part thereof;

(d) the waste heat contained in the exhaust gases of internal combustion engine 201;

(e) the reject heat of internal combustion engine's 201 cooling system or part thereof.

To implement feedback from source (a) the compressed steam upon leaving compressor 14b is divided again into its individual flows, whereby the ejected steam flow leaves via conduit 202 and the ejecting steam flow via conduit 203. The ejected steam proceeds up to distribution valve 204 where either all or part of the steam flow is directed into turbine 85 via conduit 205, while the remaining steam, if any, leaves the system as output steam via conduit 206 and outlet 207, disregarding for the time being heat exchanger/boiler 208.

The steam enters turbine 85 at a point where the prevailing pressure in the turbine is equal to the pressure of the ejected steam. Since the pressure of the steam coming from the other sources may well be different from the pressure of the ejected steam, the turbine represents a mixed pressure turbine. Concurrently, since the turbine operates at a back pressure whose corresponding condensation temperature is high enough, when any remaining superheat is superimposed as a temperature addition, to answer the process specification for industrial or residential requirements, the turbine represents at the same time, a back-pressure turbine.

To implement feedback from source (b), at distribution valve 204 either all or part of the steam flow leaves the system via conduit 206 at outlet 207, while the remainder of the steam flow, if any, is directed into turbine 85. In superheat boiler 208 either all or part of the superheat contained in the steam is transferred to a flow of condensate, at the condensing temperature of condensor 209, which is supplied by pump 210 via conduit 211, distribution valve 212, and conduit 213 into superheat boiler 208, a heat transfer device, preferably in counter-flow to the heating steam. The condensate is forwarded as boiler feed by pump 210 at such a flow rate and such a predetermined pressure which, within the given superheat range of the ejected steam, will cause the already hot condensate to be transformed into steam at the predetermined pressure, which steam is then introduced via conduits 214, 215, and 216 into turbine 85.

To implement feedback from source (c), from distribution valve 212, pump 210 supplies condensate as boiler feed at condensing temperature via conduits 217, 218, and 219 into ejecting steam superheat boiler 220, preferably in counter-flow to the heating steam. The boiler feed is forwarded at a flow rate appropriate to the ejecting steam flow and to its superheat content at such a predetermined pressure which will cause the boiler to generate steam at the predetermined pressure which, in the majority of working cases, may well be the same pressure as in superheat boiler 208. The generated steam is supplied via conduits 221 and 222 into feedback turbine 85.

To implement feedback from source (d), pump 223 supplies condensate at the condensing temperature of condenser 209 as boiler feed into exhaust boiler 224 via conduit 225, preferably in counter-flow to the exhaust gases which exit engine 201 by route of conduit 226 and leave the system via exhaust smoke stack 227. In the event that engine 201 is a diesel, the temperature of its exhaust gases may reach up to 500° C., while those of an Otto engine may possess an even higher temperature. The generated steam is supplied via conduits 228, 229 and 230 into turbine 85.

To implement feedback from source (e), the cooling system of engine 201 is kept at the highest possible pressure commensurate with good engine care. The hot cooling water is introduced by the engine's circulation pump via conduits 231 and 232 and spray nozzles 233 into evaporation chamber 234, which is kept at a slightly lower pressure than the cooling system so that an appropriate part of the water flashes off as steam, which is withdrawn via conduits 235 and 236 into feedback turbine 85 at a point where the pressure within the compressor is equal to or just lower than the pressure of steam from chamber 234. The unevaporated portion of the sprayed-in cooling water accumulates at the bottom of the chamber at the temperature corresponding to the pressure prevailing in the chamber and is permanently recycled for repeated engine body cooling via conduits 237, 238, 239 and 240 by pump 241 which also, together with the circulation pump, maintains the body cooling system at the desired pressure. At inlet valve 242 new condensate is introduced into the engine body system at the same mass-flow rate as steam is withdrawn from chamber 234.

The steam expanded in turbine 85 to its predetermined back pressure leaves via conduit 243 and proceeds up to distribution valve 244, from where as much steam is channelled through route 247 to direct contact condenser 209 as is needed to replace the condensate requirements of feedback sources (b) through (e), taking into account the addition of condensing water (of condensate quality) to the condensate occurring in direct contact condensers, so that the flow rate of steam plus the flow rate of condensing water equals the flow rate of condensate for sources (b) through (e). The remainder of the expanded steam leaves the system as output steam from distribution valve 244 via conduit 245 through steam outlet 246.

Although a direct contact condenser is shown in the embodiment of the invention in FIG. 3 a surface condenser may do as well, except in that case as much steam is channelled to the surface condenser as is required to replace the condensate requirements of sources (b) through (e) without any addition of condensing water to the condensate, so that the flow rate of steam equals the flow rate of condensate to sources (b) through (e).

Direct contact condenser 209 receives its condensing water via conduits 248, 249 and 250. The condensate/-condensing water is withdrawn from the bottom of condenser 209 by pump 253 via conduits 251, 252 and 255 up to distribution valve 256, leaving out for the time being, distribution valve 254. At distribution valve 256 the amount of condensate required for sources (b) and (c) is routed toward pump 210 in conduit 257, while the remainder of the condensate continues in conduits 258 and 259 up to distribution valve 260, where the amount of condensate necessary for feedback source (e) is routed in conduit 261 towards inlet valve 242. The remaining condensate flow, comprising the amount required for source (d) is forwarded via conduit 262 to pump 223.

When no steam is required as output of the system, but only hot water, all the steam coming from feedback turbine 85 is routed by valve 244 via conduit 247 to direct contact condenser 209. In that event, distribution valve 254 apportions the amount of condensate necessary for feedback sources (b) through (e), while the remainder of the condensate is discharged via outlet 263 as hot output water. Insofar as the steam prior to its entry into condenser 209 still possesses superheat, the hot water may not be discharged at outlet 263, but may be routed via conduits 264, 265 and 266 into heat transfer device 267 to absorb the remaining superheat, preferably in counter flow to the steam, prior to being discharged at hot water outlet 268.

Whether discharged at outlet 246 as steam, or at outlet 263 or outlet 268 as condensate of the steam, the ejected steam mass-flow represents an output of pure distilled water of the process, so that presumably impure water may be introduced via inlet 101 at the same mass-flow rate as is discharged. However, when the cooled feed water coming from the evaporation chambers via conduit 116 is discharged as output coolant at coolant outlet 120, and not recycled by route of conduit 118, the feed water has to be replenished at inlet 101 at the mass-flow rate of coolant discharged, in addition to the ejected steam mass flow rate. A fixed quantity of said pure output water may be used as condensing water of condensate quality for direct contact condensor 209.

In an otherwise identical process, but of the second category, the parallel sources of output heat energy are:

(a) the superheated ejecting steam at outlet 207;

(b) alternatively to (a): the superheat solely of the ejected steam at superheat boiler 208 or, as steam, at steam outlet 269, and the remaining saturated steam at outlet 207;

(c) the superheat solely of the ejecting steam at superheat boiler 220 or, as steam, at steam outlet 270;

(d) the heat of the exhaust gases of engine 201, at exhaust boiler 224 or, as steam, at steam outlet 271;

(e) the heat of the cooling system of engine 201 at cooling water outlet 231 as hot water.

In order to estimate the ability of the embodiment of this invention in FIG. 3 to save fuel per unit of heat generated, suppose that the otherwise identical process of the second category possesses a basic factor of augmentation of 2.0 and that the efficiency of its internal combustion engine, such as a diesel, is 0.40, then for an input of thermal equivalent of fuel of 1000 kcal, a thermal work equivalent of 400 kcal will be generated by the engine to drive the compression means for the process and to attain thereby a total thermal output of 2000 kcal. Further supposing that the feedback turbine generates a useful work equivalent of 200 kcal by way of expansion of the steam supplied to it from feedback sources (a) and (c) and half of sources (d) and (e), it means that 200 kcal of work equivalent, amounting to 50% of the total, are taken off from the work load otherwise to be carried by the fuel combusting engine. This reduces the engine to half its size and to half its input of extraneous fuel, which input then amounts to 500 kcal fuel equivalent. The halving of the size of the engine will also reduce to half the output of feed-back sources (d) and (e), which reduction is already taken into account in the useful work equivalent generated by the feed-back turbine. Since the process does not lose any heat other than a small marginal percentage to the vicinity, and this percentage can be minimized by thorough insulation, the estimated factor of augmentation of the third category process amounts thus essentially to $(2000-500)/(1000-500) = 1500/500 = 3.0$.

Though specific embodiments have been illustrated and described in the drawings, it will be readily apparent to those skilled in the art that many features are interchangeable and that many modifications may be made without departing from the spirit of the invention as disclosed and claimed.

I claim:

1. A method for increasing the ratio of thermal energy output to heating value of fuel consumed in a heat pumping process which includes delivering a first input stream of thermal energy from a low temperature source to a flow of performing fluid in the liquid state, vaporizing at least part of said flow of performing fluid, mechanically compressing said vaporized performing fluid, delivering heat from said compressed performing fluid as at least one output stream of thermal energy at a temperature level higher than that of the low temperature source, consuming fuel to generate a second input stream of thermal energy, and converting part of said second input stream of thermal energy to mechanical energy for performing said mechanical compression, the heating value of the fuel consumed being less than the corresponding output heat delivered, wherein the improvement comprises:

feeding back part of the stream of output heat as a third input stream of thermal energy to the process and converting said third input stream of thermal energy into mechanical energy for performing part of the work of mechanically compressing said vaporized performing fluid, thereby reducing the consumption of fuel otherwise required to produce an equivalent amount of mechanical energy without reducing the total work input required for said mechanical compression.

2. The method of claim 1 wherein the step of converting said third input stream of thermal energy into mechanical energy comprises expanding at least part of said compressed performing fluid in a heat engine.

3. The method of claim 1 wherein the step of converting said second input stream of thermal energy into mechanical energy comprises transferring heat from said second input stream to a working fluid of an external combustion engine.

4. The method of claim 3 wherein the step of converting said third stream of thermal energy into mechanical energy comprises transferring at least part of the heat from said compressed performing fluid to the working fluid of said external combustion engine.

5. The method of claim 4 wherein the step of transferring at least part of the heat from said compressed performing fluid to the working fluid of said external combustion engine occurs prior to transferring the heat from said second input stream.

6. The method of claim 4 wherein the step of converting said third input stream of thermal energy into mechanical energy further comprises expanding at least part of said compressed performing fluid in a heat engine.

7. The method of claim 6 wherein the step of converting said third input stream of thermal energy into mechanical energy further comprises driving an electric generator with said additional heat engine to produce electric power and energizing an electric motor with said electric generator to produce mechanical energy for compressing the performing fluid.

8. The method of claim 6 wherein the step of transferring at least part of the heat from said compressed performing fluid to the working fluid of said external combustion engine comprises transferring heat by surface heat transfer from at least part of the compressed performing fluid to said working fluid.

9. The method of claim 8 wherein said step of transferring heat from the compressed performing fluid to said working fluid takes place prior to expanding at least part of said performing fluid in the heat engine.

10. The method of claim 8 wherein said step of transferring heat from at least part of the compressed performing fluid to said working fluid takes place after expanding said performing fluid in said heat engine.

11. The method of claim 8 wherein said step of transferring heat from at least part of the compressed performing fluid to said working fluid is conducted in parallel with said step of expanding at least part of the compressed performing fluid in said heat engine.

12. The method of claim 9 or 10 further comprising condensing the performing fluid after said expansion step.

13. The method of claim 12 wherein said step of condensing the performing fluid comprises transferring heat from the performing fluid by surface heat transfer to a condensing fluid passing in counter-flow to the performing fluid.

14. The method of claim 13 further comprising transferring residual heat from said condensed performing fluid to said condensing fluid to cool the performing fluid to a temperature below that of the low temperature source and to preheat the condensing fluid prior to its utilization in the condensing step.

15. The method of claim 14 further comprising returning said cooled condensed performing fluid to pass in heat transfer relation with the low temperature source to close the cycle.

16. The method of claim 13 wherein the performing fluid leaves the compression step in the form of superheated vapor, and the method further comprises passing part of the condensing fluid after leaving the condensing step in counterflow heat exchange with the superheated compressed performing fluid to extract the superheat of said latter fluid before it enters the condensing step.

17. The method of claim 16 further comprising delivering said part of the condensing fluid after extracting the superheat from the performing fluid as a first output heat source of the process and delivering the remainder of said condensing fluid after said condensing step as a second output heat source of the process.

18. The method of claim 1 wherein the step of vaporizing at least part of said flow of performing fluid comprises maintaining the flow of performing fluid in the liquid state at a pressure below its saturation pressure at the temperature of the low temperature source and delivering sufficient heat in said first input stream to vaporize at least part of said flow of performing fluid.

19. The method of claim 1 wherein the step of vaporizing at least part of said flow of performing fluid comprises reducing the pressure of said performing fluid after delivering said first input stream of thermal energy from the low temperature source to below its saturation pressure and flashing off part of said flow of performing fluid as vapor.

20. The method of claim 19 further comprising thermo-compressing said vaporized performing fluid by steam ejection prior to said mechanical compression step.

21. The method of claim 4 further comprising condensing said flow of compressed performing fluid after said step of transferring heat from said performing fluid to the working fluid of said external combustion engine and utilizing at least part of said condensed performing fluid as the working fluid for said external combustion engine.

22. The method of claim 21 wherein the initial flow of performing fluid in the liquid state consists of impure water, and the method further comprises discharging the working fluid from said external combustion engine from the process as pure water.

23. The method of claim 1 wherein part of said second input steam of thermal energy is converted into mechanical energy in an internal combustion engine.

24. The method of claim 23 wherein the step of converting said third input stream of thermal energy into mechanical energy comprises expanding at least part of said compressed performing fluid in a heat engine.

25. The method of claim 24, further comprising condensing at least part of the expanded performing fluid from the heat engine and delivering at least part of the condensate as an output source of hot water from the process.

26. The method of claim 25, further comprising flowing at least part of said condensed fluid in heat transfer relation to the expanded performing fluid to transfer superheat remaining in said expanded performing fluid to said condensate prior to condensing said expanded performing fluid.

27. The method of claim 25, further comprising flowing at least part of said condensed performing fluid in heat transfer relation to exhaust gases from the internal combustion engine to vaporize said fluid and delivering said thus vaporized performing fluid to an inlet of the heat engine for converting part of the heat energy received from the exhaust gases into mechanical energy delivered by the heat engine.

28. The method of claim 25 wherein the step of feeding back part of the stream of output heat as a third input stream comprises flowing at least part of said condensed performing fluid in heat transfer relation to part of said mechanically compressed vaporized performing fluid to vaporize said condensed performing fluid and delivering said thus vaporized performing fluid to an inlet of the heat engine for converting part of the heat energy received from the mechanically compressed performing fluid into mechanical energy delivered by the heat engine.

29. The method of claim 25 or 28 wherein the step of vaporizing at least part of the flow of performing fluid delivered from the low temperature source comprises reducing the pressure of said performing fluid after delivering thereto said first input stream of thermal energy by means of steam ejection to flash off part of said flow as vapor, the method further comprising delivering part of the mechanically compressed vaporized performing fluid, as ejecting steam for said vaporization step.

30. The method of claim 29, further comprising flowing at least part of said condensed performing fluid in heat transfer relation to said part of the mechanically compressed vaporized performing fluid being delivered as ejecting steam to vaporize the former by transfer of superheat from the latter and delivering said thus vaporized performing fluid to an inlet of the heat engine for converting part of the heat energy received from the part of the mechanically compressed performing fluid being delivered as ejecting steam into mechanical energy delivered by the heat engine.

31. The method of claim 24 further comprising delivering heated cooling water from said internal combustion engine to an evaporation chamber, said chamber having a pressure lower than the saturation pressure of said heated cooling water; evaporating part of the engine cooling water in said chamber; and delivering said evaporated part of the engine cooling water to an inlet of the heat engine for converting part of the otherwise reject heat from the internal combustion engine into mechanical energy delivered by the heat engine.

32. Heat pumping apparatus for providing an increased ratio of thermal energy output to heating value of fuel consumed, the apparatus including means for delivering a first input stream of thermal energy from a low temperature source to a flow of performing fluid in the liquid state, means for evaporating at least part of the flow of performing fluid, mechanical compressor means having an input connected to the evaporating means for compressing the vaporized part of the performing fluid at a temperature higher than temperature of the low temperature source, heat engine means for consuming fuel as a second input stream of thermal energy and for delivering at least part of the mechanical energy required for driving the mechanical compressor, and means connected to the output of the mechanical compressor means for delivering a greater quantity of heat from said compressed performing fluid as at least one output stream of thermal energy than the heating value of the fuel consumed, wherein the improvement comprises:

means coupled to said means for delivering at least one output stream of thermal energy for returning part of said at least one output stream as a third input stream of thermal energy and means for converting said third input stream of thermal energy into mechanical energy for performing part of the work of mechanically compressing said vaporized performing fluid, thereby reducing the amount of fuel otherwise required to produce an equivalent amount of mechanical energy.

33. Apparatus according to claim 32 wherein said heat engine means comprises fuel consuming boiler means for vaporizing a working fluid and a vaporized fluid expansion engine for expanding said vaporized working fluid, and said means for returning part of said output stream of thermal energy as a third input stream comprises heat exchanger means for transferring part of the heat from said compressed performing fluid to the working fluid into said fuel consuming boiler means.

34. Apparatus according to claim 33 wherein said fuel consuming means for vaporizing a working fluid comprises a fuel combustor for burning a fuel in a stream of air, a steam generator for transferring heat from the combusted gases to the working fluid, and a combustion air preheater for transferring heat from the combusted gases to the stream of air before the latter enters the steam generator.

35. Apparatus according to claim 34 wherein said fuel consuming means further comprises an economizer for transferring heat from the combustion gases, after they leave the steam generator and before they enter the combustion air preheater, to the working fluid after it leaves the heat exchanger means and before it enters said fuel consuming boiler means.

36. Apparatus according to claim 32 wherein said means for returning part of said output stream of thermal energy as a third input stream comprises a line coupled to the outlet of the mechanical compressor means, and the means for converting said third input stream of thermal energy into mechanical energy for performing part of the work of mechanically compressing said vaporized performing fluid comprises a compressed vapor expansion engine for expanding at least part of the compressed performing fluid.

37. Apparatus according to claim 36 wherein the means for converting said third input stream of thermal energy into mechanical energy for performing part of the work of mechanically compressing said vaporized performing fluid further comprises an electric generator driven by said additional vaporized fluid expansion engine and an electric motor coupled to said mechanical compressor means and driven by said electric generator.

38. Apparatus according to claim 37 wherein said mechanical compressor means comprises at least one compressor stage having a first shaft driven by said first mentioned compressed vapor expansion engine and at least one additional compressor stage having a second shaft driven by said electric motor.

39. Apparatus according to claim 38 wherein said at least one compressor stage is connected in series with and downstream of said at least one additional compressor stage.

40. Apparatus according to claim 32 wherein the means for evaporating at least part of said performing fluid comprises means for throttling the performing fluid to a pressure below its saturation pressure at the temperature of said low temperature source prior to the entry of said performing fluid into said means for delivering thermal energy from said low temperature source.

41. Apparatus according to claim 32 wherein said means for delivering a first input stream of thermal energy from a low temperature source comprises a conduit with heat transferring walls for transporting said performing fluid in thermal contact with said low temperature source.

42. Apparatus according to claim 32 wherein the means for evaporating said performing fluid comprises an evaporation plant connected between the means for delivering thermal energy from said low temperature source and the mechanical compressor means.

43. Apparatus according to claim 42 wherein the evaporation plant comprises at least one evaporation chamber and a vapor ejector connected to each evaporation chamber for maintaining the pressure in the corresponding evaporation chamber below the saturation pressure of the performing fluid in the chamber and for delivering part of the performing fluid passing through the chamber as thermocompressed vapor to the inlet of the mechanical compressor means.

44. Apparatus according to claim 43 wherein the evaporation plant comprises at least two evaporation chambers, the second chamber having a lower pressure than the first chamber and being connected to receiving performing fluid discharged as liquid from the first evaporation chamber, and the evaporation plant further comprises a vapor collector connected to the output of each ejector of the corresponding evaporation chamber.

45. Apparatus according to claim 43 or 44 comprising means for pumping performing fluid as liquid from the lowest pressure evaporation chamber for delivery as an output of cooling capacity.

46. Apparatus according to claim 43 or 44 comprising means for pumping performing fluid as liquid from the lowest pressure evaporation chamber for recirculation back to the means for delivering a first input of thermal energy from said low temperature source.

47. Apparatus according to claim 32 wherein said heat engine means comprises an internal combustion engine; said means for returning part of said output stream of thermal energy as a third input stream comprises a bypass line connected to the outlet of said mechanical compressor means; and the means for converting said third input stream of thermal energy into mechanical energy for performing part of the work of mechanically compressing said vaporized performing fluid comprises a feedback vaporized fluid expansion engine connected to said bypass line for expanding at least part of said vaporized performing fluid.

48. Apparatus according to claim 47 wherein said means for returning part of said output stream of thermal energy as a third input stream further comprises heat exchanger boiler means connected to the output of said mechanical compressor means downstream from the connection of said bypass line for transferring at least part of the heat from said compressed performing fluid to vaporize a stream of working fluid delivered to said feedback vaporized fluid expansion engine.

49. Apparatus according to claim 48 further comprising means for condensing at least part of the expanded fluid discharged from said feedback vaporized fluid expansion engine and means for recirculating at least part of said condensed fluid through said heat exchanger/boiler means as part of said stream of working fluid.

50. Apparatus according to claim 49 wherein the means for condensing at least part of the expanded fluid discharged from said feedback vaporized fluid expansion engine comprises a direct contact condenser, said apparatus further comprising a heat transfer device for transferring heat to part of the condensate discharged from said condenser from the recirculated expanded fluid discharged from said feedback vaporized fluid expansion engine prior to entry of said recirculated fluid into said condenser.

51. Apparatus according to claim 49 or 50 wherein the means for evaporating said performing fluid comprises an evaporation plant connected between the means for delivering thermal energy from said low temperature source and the mechanical compressor means, said evaporation plant comprising at least one evaporation chamber and a vapor ejector connected to each evaporation chamber for maintaining the pressure in the corresponding evaporation chamber below the saturation pressure of the preforming fluid in the chamber and for delivering part of the performing fluid passing through the chamber as thermocompressed vapor to the inlet of the mechanical compressor means.

52. Apparatus according to claim 51 further comprising a conduit connected between the output of the mechanical compressor means and each vapor ejector for recirculating part of the compressed performing fluid as ejecting vapor.

53. Apparatus according to claim 52 further comprising an ejecting vapor superheat boiler installed in said recirculating conduit and means, for recirculating an additional part of said condensed fluid through said ejecting vapor superheat boiler for transferring at least part of the superheat from said recirculated compressed performing fluid to vaporize said recirculated additional part of said condensed fluid as an additional stream of working fluid delivered to said feedback vaporized fluid expansion engine.

54. Apparatus according to claim 49 further comprising an exhaust boiler connected to the exhaust gas outlet of said internal combustion engine and means for recirculating an additional part of said condensed fluid through said exhaust heat boiler for transferring heat from said exhaust gases to vaporize said recirculated additional part of said condensed fluid as an additional stream of working fluid delivered to said feedback vaporized fluid expansion engine.

55. Apparatus according to claim 49 further comprising an engine cooling water recirculation system including an evaporation chamber maintained at a pressure below the saturation pressure of the hot cooling water leaving the engine for evaporating part of said recirculated water, pump means for returning the cooled remainder of the cooling water to the engine, and a conduit for delivering the evaporated part of the cooling water as an additional stream of working fluid to said feedback vaporized fluid expansion engine.

56. Apparatus according to claim 55 further comprising a conduit between said condensing means and the engine cooling water recirculation line for delivering part of said condensed fluid as makeup cooling water to replace the evaporated part of said recirculated cooling water.

57. Apparatus according to claim 47 wherein said mechanical compressor means comprises at least one compressor stage having a first shaft driven by said internal combustion engine and at least one additional compressor stage having a second shaft driven by said feedback vapor expansion engine.

* * * * *

UNITED STATES PATENT AND TRADEMARK OFFICE
CERTIFICATE OF CORRECTION

PATENT NO. : 4,313,305
DATED : 2 February 1982
INVENTOR(S) : Dan EGOSI

It is certified that error appears in the above—identified patent and that said Letters Patent is hereby corrected as shown below:

In the Abstract, line 5: change "evaporized" to --vaporized--.

Column 1, line 54: change "for" to --of--.

Column 3, line 25: after "kcal" insert --to 600 kcal--.

Column 6, line 39: after "vapor" insert --coming from--.

Column 6, line 43: change "super-heat" to --superheat--.

Column 6, line 47: change "condensor" to --condenser--.

Column 11, line 50: change "channeled" to --channelled--.

Column 15, line 53: change "densor" to --denser--.

Column 17, line 39: change "condensor" to --condenser--.

Column 20, line 27: change "steam" to --stream--.

Signed and Sealed this

Twenty-fifth Day of May 1982

[SEAL]

Attest:

Attesting Officer

GERALD J. MOSSINGHOFF
Commissioner of Patents and Trademarks